(12) United States Patent
Yasui (10) Patent No.: US 8,864,317 B2
(45) Date of Patent: Oct. 21, 2014

(54) PROJECTION DISPLAY

(75) Inventor: Toshifumi Yasui, Kanagawa (JP)

(73) Assignee: Sony Corporation, Tokyo (JP)

(*) Notice: Subject to any disclaimer, the term of this patent is extended or adjusted under 35 U.S.C. 154(b) by 215 days.

(21) Appl. No.: 13/618,888

(22) Filed: Sep. 14, 2012

(65) Prior Publication Data

US 2013/0088652 A1   Apr. 11, 2013

(30) Foreign Application Priority Data

Oct. 7, 2011  (JP) ................................. 2011-223092
Feb. 23, 2012  (JP) ................................. 2012-037017

(51) Int. Cl.
| | | |
|---|---|---|
| G03B 21/14 | (2006.01) | |
| G03B 33/08 | (2006.01) | |
| H04N 9/31 | (2006.01) | |
| G03B 21/20 | (2006.01) | |
| H04N 5/74 | (2006.01) | |
| G03B 33/06 | (2006.01) | |

(52) U.S. Cl.
CPC ............ *G03B 21/2033* (2013.01); *G03B 33/08* (2013.01); *H04N 9/3114* (2013.01); *H04N 9/317* (2013.01); *H04N 9/3161* (2013.01); *H04N 5/74* (2013.01); *G03B 33/06* (2013.01)
USPC .................. 353/79; 353/30; 353/37; 353/38; 353/74; 353/99; 359/460; 359/443

(58) Field of Classification Search
USPC ........... 353/30, 31, 37, 38, 74, 79, 85, 94, 98, 353/99, 102; 348/743–747, 750, 757, 758, 348/E9.027; 349/5, 7–9; 359/460, 443, 453, 359/455, 457, 728, 771, 781, 795
See application file for complete search history.

(56) References Cited

U.S. PATENT DOCUMENTS

| | | | | |
|---|---|---|---|---|
| 8,388,147 | B2 * | 3/2013 | Murata et al. .................... | 353/79 |
| 8,480,235 | B2 * | 7/2013 | Inoko ............................... | 353/38 |
| 2002/0027720 | A1 * | 3/2002 | Nishikawa et al. ............ | 359/678 |
| 2009/0027575 | A1 * | 1/2009 | Miyauchi et al. ................ | 349/5 |
| 2009/0051833 | A1 * | 2/2009 | Watanabe et al. ................ | 349/8 |
| 2009/0273760 | A1 * | 11/2009 | Itoh ................................ | 353/38 |

FOREIGN PATENT DOCUMENTS

JP          3960972          5/2007

* cited by examiner

*Primary Examiner* — Sultan Chowdhury
(74) *Attorney, Agent, or Firm* — K&L Gates LLP (57) ABSTRACT

A projection display satisfies formulas $\{(4FR')/(W'TphR)\} \geq 0.015$ and $W' \leq 0.5$, where: F is an F-number of a projection lens; W' is a diagonal size (inch number) of a light modulation element; ph is a pixel count in one side direction of the light modulation element; T is a throw ratio of the projection display (=a projection distance s/a distance L in the one side direction of a projected image on a projection plane); R is a radius of an exit pupil of the projection lens; I is an integrated light quantity obtained by, in a light quantity distribution in the exit pupil, radially integrating the light quantity up to the radius R; and I'(=I/2) is an integrated light quantity obtained by, in the light quantity distribution in the exit pupil, radially integrating the light quantity up to a predetermined radius R' about barycenter of the light quantity distribution.

14 Claims, 6 Drawing Sheets

PROJECTION DISPLAY

CROSS REFERENCES TO RELATED APPLICATIONS

The present disclosure contains subject matter related to that disclosed in Japanese Priority Patent Application JP 2011-223092 filed in the Japan Patent Office on Oct. 7, 2011 and Japanese Priority Patent Application JP 2012-037017 filed in the Japan Patent Office on Feb. 23, 2012, the entire content of each of which is hereby incorporated by reference.

BACKGROUND

The present disclosure relates to a projection display that performs image display using a projection lens.

An optical module as one of the major components of a projector (projection display) is typically configured of an illumination optical system (illuminating system) including a light source, and a projection optical system including a light modulation device and a projection lens.

In the field of such projectors, a small (palm-sized) and lightweight, portable projector called microprojector is beginning to be widespread. In addition, a projector incorporating an auto focus (AF) mechanism is currently proposed in order to improve user convenience (for example, see Japanese Patent No. 3960972).

SUMMARY

The projector having the AF mechanism as disclosed in Japanese Patent No. 3960972 includes such a mechanism (mechanical structure) in its body. Hence, for example, in the case where the projector is used for the above-described micro-projector, the AF mechanism may be a cause of inhibiting a reduction in size (a reduction in weight and/or cost) of the projector though the mechanism provides a focus-free function. It is therefore desired to propose a technique that achieves a substantial focus-free function (i.e., does not have to bring it into focus substantially) to improve user convenience while achieving a reduction in size.

It is desirable to provide a projection display that allows an improvement in user convenience while achieving a reduction in size.

A projection display according to an embodiment of the disclosure includes: a light source section; a light modulation element modulating, based on an image signal, light emitted from the light source section; and a projection lens projecting the light modulated by the light modulation element onto a plane of projection, wherein the following formulas (1) and (2) are satisfied:

$$\{(4FR')/(W'TphR)\} \leq 0.015 \quad (1)$$

$$W' \leq 0.5 \quad (2)$$

where: F is an F-number of the projection lens; W' is a diagonal size (inch number) of the light modulation element; ph is a pixel count in one side direction of the light modulation element; T is a throw ratio of the projection display itself (=a projection distance s/a distance L in the one side direction of a projected image on the plane of projection); R is a radius of an exit pupil of the projection lens; I is an integrated quantity of light obtained by, in a distribution of a quantity of light in the exit pupil of the projection lens, radially integrating the quantity of light up to the radius R of the exit pupil; and I' (=I/2) is an integrated quantity of light obtained by, in the distribution of the quantity of light in the exit pupil, radially integrating the quantity of light up to a predetermined radius R' about barycenter of the distribution of the quantity of light.

In the projection display according to the above embodiment of the disclosure, the light emitted from the light source section is modulated by the light modulation element based on the image signal, and the modulated light is projected by the projection lens onto the plane of projection. Here, the formulas (1) and (2) are satisfied, thereby the depth of field increases and a substantial focus-free function is achieved without an AF mechanism and/or other mechanisms incorporated in the projection display.

According to the projection display of the above embodiment of the disclosure, the formulas (1) and (2) are satisfied, allowing a substantial focus-free function to be achieved without an AF mechanism and/or other mechanisms incorporated in the projection display. The projection display therefore allows an improvement in user convenience while achieving a reduction in size.

Additional features and advantages are described herein, and will be apparent from the following Detailed Description and the figures.

DETAILED DESCRIPTION

Embodiments of the present application will be described below in detail with reference to the drawings.

Hereinafter, an embodiment of the present disclosure will be described in detail with reference to the accompanying drawings. It is to be noted that description is made in the following order.

1. Embodiment (example where each pixel of an optical modulation element has a square shape).
2. Modification (example where each pixel of an optical modulation element has a rectangular shape).
3. Other modifications

Embodiment

Overall Configuration of Projection Display 3

Figure 1:
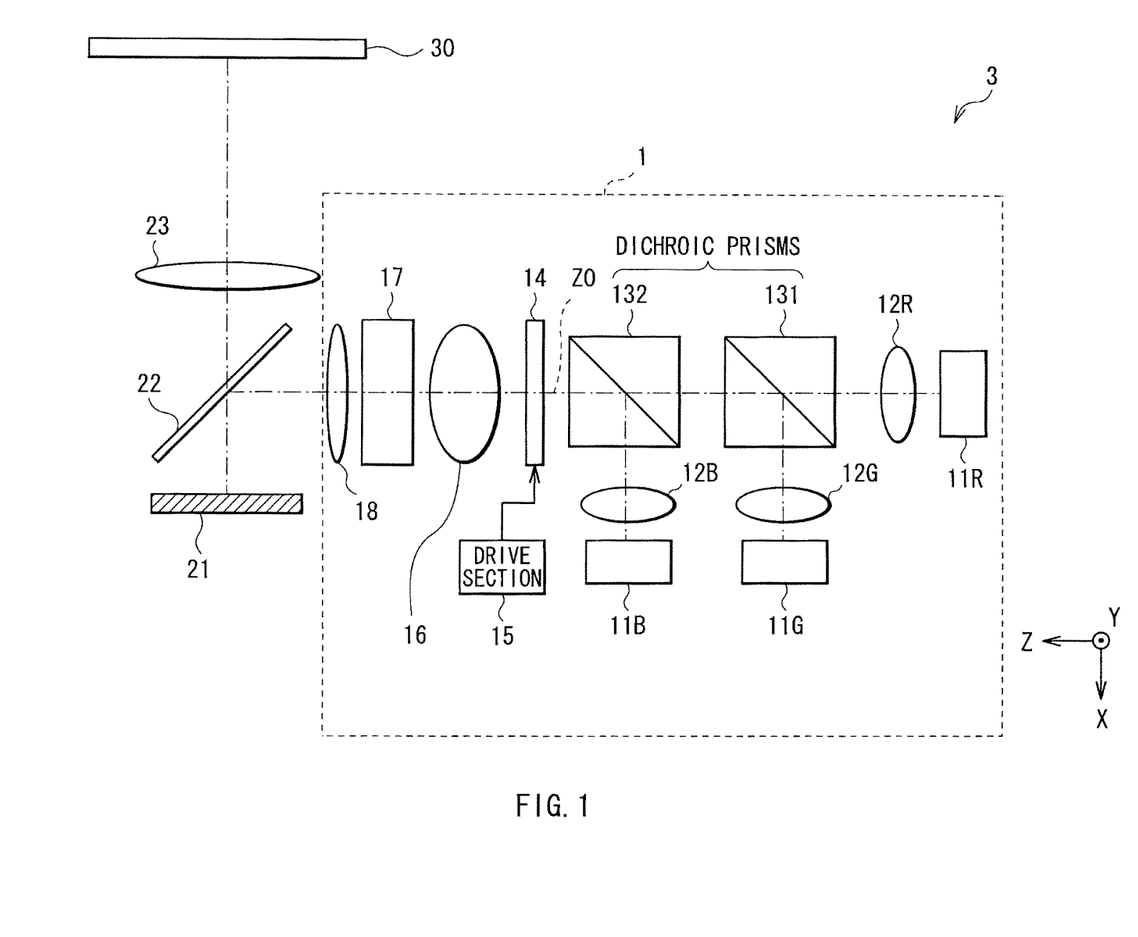
FIG. 1 is a diagram illustrating an overall configuration of a projection display according to an embodiment of the disclosure.

FIG. 1 illustrates an overall configuration of a projection display (projection display 3) according to an embodiment of the disclosure. The projection display 3 is a display (projector) that projects an image (image light) onto a screen 30 (plane of projection), and includes an illuminating system 1 and an optical system (display optical system) for image display using illumination light from the illuminating system 1.

(Illuminating System 1)

The illuminating system 1 includes: a red laser 11R; a green laser 11G; a blue laser 11B; lenses 12R, 12G, and 12B; dichroic prisms 131 and 132; an optical element 14; a drive section 15; a collimator lens 16; a fly-eye lens 17; and a condenser lens 18. It is to be noted that Z0 represents a light axis in FIG. 1.

The red laser 11R, the green laser 11G, and the blue laser 11B are three types of light sources that emit red laser light, green laser light, and blue laser light, respectively. These laser light sources configure a light source section. That is, the three types of light sources are each a laser light source herein. The red laser 11R, the green laser 11G, and the blue laser 11B are each configured of a semiconductor laser or a solid-state laser, for example. For example, in the case where the laser light sources are each a semiconductor laser, a wavelength $\lambda r$ of the red laser light is about 600 nm to 700 nm, a wavelength $\lambda g$ of the green laser light is about 500 nm to 600 nm, and a wavelength $\lambda b$ of the blue laser light is about 400 nm to 500 nm, for example.

The red laser 11R, the green laser 11G, and the blue laser 11B each emit light, for example, in a pulsed manner. Specifically, the red laser 11R intermittently emits red laser light at a predetermined emission frequency flr [Hz] (emission period Tr=1/flr). The green laser 11G intermittently emits green laser light at a predetermined emission frequency flg [Hz] (emission period Tg=1/flg). The blue laser 11B intermittently emits blue laser light at a predetermined emission frequency flb [Hz] (emission period Tb=1/flb). In addition, for example, the red laser light, the green laser light, and the blue laser light may be sequentially and time-divisionally emitted in this order. The emission frequencies flr, flg, and flb indicate fundamental frequencies of the respective laser light. Here, for example, the emission frequencies flr, flg, and flb are assumed to be equal to one another (hereinafter, description is appropriately made assuming that flr=flg=flb=fl is true). Although the emission frequency fl is typically about 60 to 120 [Hz] herein, the emission frequency fl can be determined depending on display image quality on the projector (the projection display 3) and/or other factors without limitation.

The lenses 12R and 12G are lenses (coupling lenses) that collimate the red laser light emitted from the red laser 11R and the green laser light emitted from the green laser 11G (to form parallel light), respectively, so as to be coupled with the dichroic prism 131. Similarly, the lens 12B is a lens (a coupling lens) that collimates the blue laser light emitted from the blue laser 11B (to form parallel light) so as to be coupled with the dichroic prism 132. It is to be noted that although these lenses 12R, 12G, and 12B each collimate incident laser light (to form parallel light) herein, this is not limitative, and the lenses 12R, 12G, and 12B may not collimate the incident laser light (may not form parallel light). However, a display configuration is advantageously reduced in size through collimation of the incident laser light as described above.

The dichroic prism 131 is a prism that selectively transmits the red laser light received through the lens 12R, while selectively reflecting the green laser light received through the lens 12G. The dichroic prism 132 is a prism that selectively transmits the red laser light and the green laser light emitted from the dichroic prism 131, while selectively reflecting the blue laser light received through the lens 12B. This allows color composition (optical path composition) of the red laser light, the green laser light, and the blue laser light.

The optical element 14 is disposed on an optical path between the light source and the fly-eye lens 17 (specifically, on an optical path between the dichroic prism 132 and the collimator lens 16). The optical element 14 is an optical element that reduces so-called speckle noise (an interference pattern), and laser light, advancing along a depicted light axis Z0, passes through the optical element 14. In other words, the three types of laser light (the red laser light, the green laser light, and the blue laser light), which are intermittently emitted from the light source section (the red laser 11R, the green laser 11G, and the blue laser 11B) at an emission frequency fl (=flr, flg, and flb), each pass through the optical element 14.

The drive section 15 displaces a relative position between the optical element 14 and the fly-eye lens 17, thereby varies one or both of an incident position and an incident angle of laser light (an incident position and/or an incident angle) in an incident plane of the fly-eye lens 17. The drive section 15 displaces the relative position through (finely) vibrating the optical element 14, for example. It is to be noted that the drive section 15 is configured of for example, a coil and a permanent magnet (for example, a permanent magnet including a material such as neodymium (Nd), iron (Fe), and boron (B)).

The collimator lens 16, which is disposed on an optical path between the optical element 14 and the fly-eye lens 17, is a lens that collimates light exiting from the optical element 14 (to form parallel light).

The fly-eye lens 17 is an optical component (integrator) including a plurality of lenses arranged two-dimensionally on a substrate, and spatially divides incident beams depending on arrangement of the lenses, and emits the divided beams. Consequently, light is emitted uniformly (with a uniform intensity distribution in a plane) from the fly-eye lens 17 in a form of illumination light.

The condenser lens 18 is a lens that receives the light (illumination light) uniformly emitted from the fly-eye lens 17, and condenses the illumination light.

(Display Optical System)

The display optical system is configured of a polarization beam splitter (PBS) 22, the light modulation element 21, and a projection lens 23 (projection optical system).

The polarization beam splitter 22 is an optical component that selectively transmits particular polarized light (for example, s-polarized light), and selectively reflects another polarized light (for example, p-polarized light). Thus, illumination light (for example, s-polarized light) from the illuminating system 1 is selectively reflected by the polarization beam splitter 22 and enters the light modulation element 21, and image light (for example, p-polarized light) emitted from the light modulation element 21 is selectively transmitted by the polarization beam splitter 22 and enters the projection lens 23.

The light modulation element 21 is an element that emits image light through modulating the illumination light from the illuminating system 1 based on an image signal supplied from an undepicted display control section. The light modulation element 21 is configured of for example, a liquid crystal device (reflective liquid crystal device) such as liquid crystal on silicon (LCOS) or a digital micromirror device (DMD). Here, the light modulation element 21 reflects light such that types of polarized light are different (for example, s-polarized light and p-polarized light) between incident light and outgoing light.

The projection lens 23 is a lens that (expansively) projects the illumination light (image light) modulated by the light modulation element 21 onto the screen 30.

[Detailed Configuration for Achievement of Substantial Focus-Free Function]

Description is now made on a detailed configuration for achievement of a substantial focus-free function of the projection display 3 according to the embodiment.

(Method of Calculating Conditional Formula)

Figure 2:
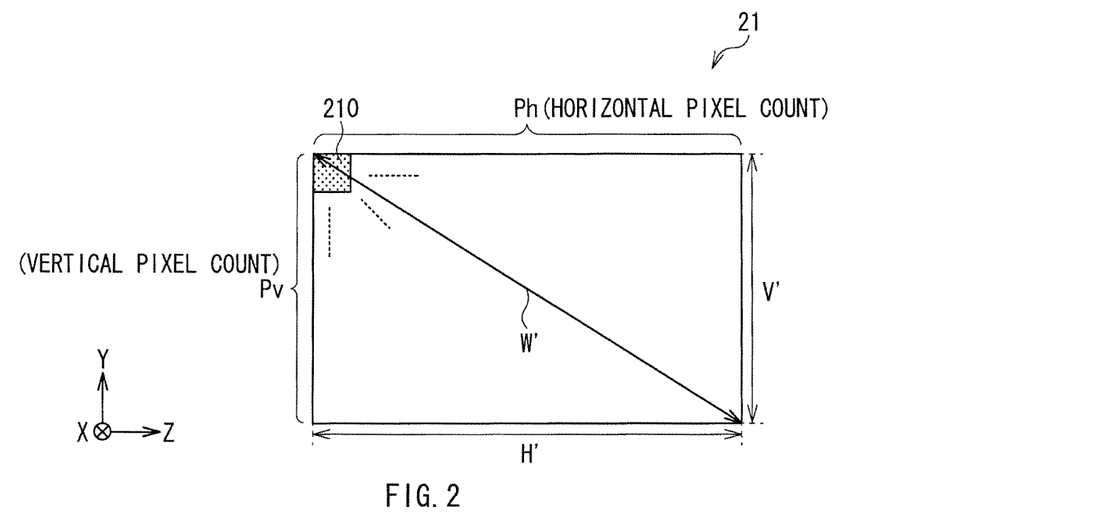
FIG. 2 is a schematic view illustrating an exemplary detailed configuration of a light modulation element illustrated in FIG. 1.

First, for example, as illustrated in FIG. 2, the light modulation element 21 is assumed to have a plurality of pixels 210 arranged in a matrix, each pixel having a square planar shape. Here, the light modulation element 21 has a length H' in a lateral (horizontal or Z-axis) direction, a length V' in a longitudinal (vertical or Y-axis) direction, a diagonal size (inch number) W', a pixel count (the number of the pixels 210) ph in a horizontal direction (one side direction), and a pixel count pv in a vertical direction (another side direction).

Figure 3:
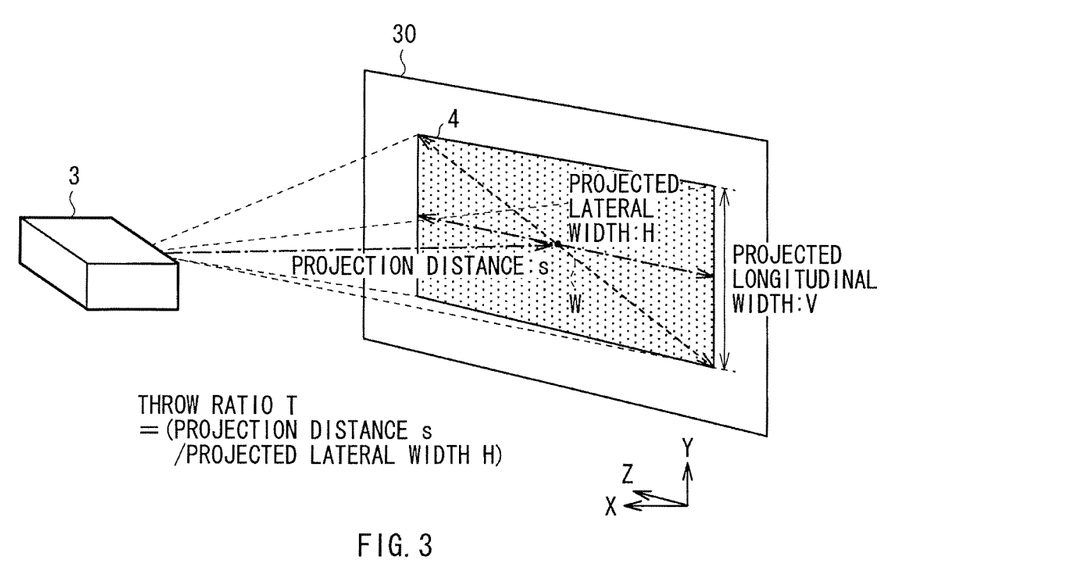
FIG. 3 is a schematic view for explaining a throw ratio of the projection display.

In addition, for example, as illustrated in FIG. 3, a projected image 4 projected from the projection display 3 onto the screen 30 has a length (projected lateral width) H in the lateral (horizontal or Z-axis) direction, a length (projected longitudinal width) V in the longitudinal (vertical or Y-axis) direction, and a diagonal size (inch number) W. In addition, when a distance (projection distance) from the projection display 3 to the screen 30 (projected image 4) is represented as s, a throw ratio T of the projection display 3 itself is defined as "projection distance s"/"distance L (here, projected lateral width H) in one side direction of the projected image 4", as illustrated in FIG. 3.

Here, when the projection lens 23 has a focal distance f [mm] and a permissible circle of confusion c, the front depth of field a1 [mm] and a rear depth of field a2 [mm] are expressed by the following formulas (1) and (2), respectively. In the formulas, the F-number (geometrical F-number) of the projection lens 23 in the projection display 3 is denoted as F. It is to be noted that the projection distance "s" represents a distance from the front principal point of the projection lens 23.

$$\begin{cases} a1 = -\dfrac{s(f+s)\varepsilon F}{f^2 + (f+s)\varepsilon F} & (1) \\ a2 = \dfrac{s(f+s)\varepsilon F}{f^2 - (f+s)\varepsilon F} & (2) \end{cases}$$

Hence, a focal distance, at which an image is deemed as in focus, is expressed by the following formulas (3) and (4) with a near-side projection distance s1 and a far-side projection distance s2.

$$\begin{cases} s1 = s + a1 = \dfrac{sf^2}{f^2 + (f+s)\varepsilon F} = \dfrac{s}{1 + \dfrac{1}{f^2}(f+s)\varepsilon F} & (3) \\ s2 = s + a2 = \dfrac{sf^2}{f^2 - (f+s)\varepsilon F} = \dfrac{s}{1 - \dfrac{1}{f^2}(f+s)\varepsilon F} & (4) \end{cases}$$

The following formulas (5) and (6) are established with an image magnification β, and a distance s' from the back principal point of the projection lens 23 to the light modulation element 21. Thus, the focal distance f is expressed by the following formula (7).

$$\begin{cases} \beta = \dfrac{s}{s'} & (5) \\ \dfrac{1}{f} = \dfrac{1}{s} + \dfrac{1}{s'} & (6) \\ f = \dfrac{1}{\dfrac{1}{s} + \dfrac{1}{s'}} = \dfrac{1}{\dfrac{1}{s}(1+\beta)} = \dfrac{s}{1+\beta} & (7) \end{cases}$$

The focal distance f determined by the formula (7) is substituted into each of the formulas (3) and (4), so that the following formulas (8) and (9) are obtained.

$$\begin{cases} s1 = \dfrac{s}{1 + \dfrac{1}{f^2}(f+s)\varepsilon F} = \dfrac{s}{1 + \dfrac{(1+\beta)^2}{s^2}\left(\dfrac{s}{(1+\beta)}+s\right)\varepsilon F} = \dfrac{s^2}{s + (1+\beta)(2+\beta)\varepsilon F} & (8) \\ s2 = \dfrac{s}{1 - \dfrac{1}{f^2}(f+s)\varepsilon F} = \dfrac{s}{1 - \dfrac{(1+\beta)^2}{s^2}\left(\dfrac{s}{(1+\beta)}+s\right)\varepsilon F} = \dfrac{s^2}{s - (1+\beta)(2+\beta)\varepsilon F} & (9) \end{cases}$$

The image magnification β is expressed as the following formula (10) with the diagonal size (inch number) W' of the light modulation element 21 and the diagonal size (inch number) W of the projected image 4.

$$\beta = (W/W') \quad (10)$$

The throw ratio T is expressed as the following formulas (11) and (12) with an aspect ratio of the projected image 4, i.e., projected lateral width H/projected longitudinal width V, and a conversion factor k from the diagonal size W [inch] to the projected lateral width H [mm]. As a result, the following formula (13) is established.

$$\begin{cases} k = 25.4 \dfrac{H}{\sqrt{H^2 + V^2}} & (11) \\ T = \dfrac{s}{k \cdot W} & (12) \\ \beta = \dfrac{W}{W'} = \dfrac{s}{kTW'} & (13) \end{cases}$$

Two values α and γ are defined by the following formulas (14) and (15), respectively, and thus behavior with respect to the projection distance s is determined by the values α and γ specific to the projection display. It is to be noted that, for example, if the projection display includes a movable zoom mechanism, values of α and γ are each likely to vary along with zooming. Here, a value of the zoom center is assumed to be used for simplicity.

$$\begin{cases} \alpha = \dfrac{1}{kTW'} & (14) \\ \gamma = \varepsilon F & (15) \end{cases}$$

Consequently, the near-side projection distance s1 and the far-side projection distance s2 are expressed by the following formulas (16) and (17), respectively.

$$\begin{cases} s1 = \dfrac{s^2}{s+(1+\alpha s)(2+\alpha s)\gamma} = \dfrac{s^2}{s+\alpha^2\left(s+\dfrac{1}{\alpha}\right)\left(s+\dfrac{2}{\alpha}\right)\gamma} & (16) \\ s2 = \dfrac{s^2}{s-(1+\alpha s)(2+\alpha s)\gamma} = \dfrac{s^2}{s-\alpha^2\left(s+\dfrac{1}{\alpha}\right)\left(s+\dfrac{2}{\alpha}\right)\gamma} & (17) \end{cases}$$

The projection distance s is typically 200 mm or more. The value a is about 0.2, even when assuming that projected lateral width H/projected longitudinal width V is 16/9, the throw ratio T is 1.00, and the diagonal size (inch number) W' of the light modulation element 21 is 0.2 inches. Thus, the projection distance s is sufficiently larger than $(2/\alpha)=10$. Hence, $s\gg(2/\alpha)$ and $s\gg(1/\alpha)$ may be assumed. In consideration of these, the near-side projection distance s1 and the far-side projection distance s2 are expressed by the following formulas (18) and (19), respectively.

$$\begin{cases} s1 \approx \dfrac{s}{1+\alpha^2\gamma s} & (18) \\ s2 \approx \dfrac{s}{1-\alpha^2\gamma s} & (19) \end{cases}$$

Figure 4:
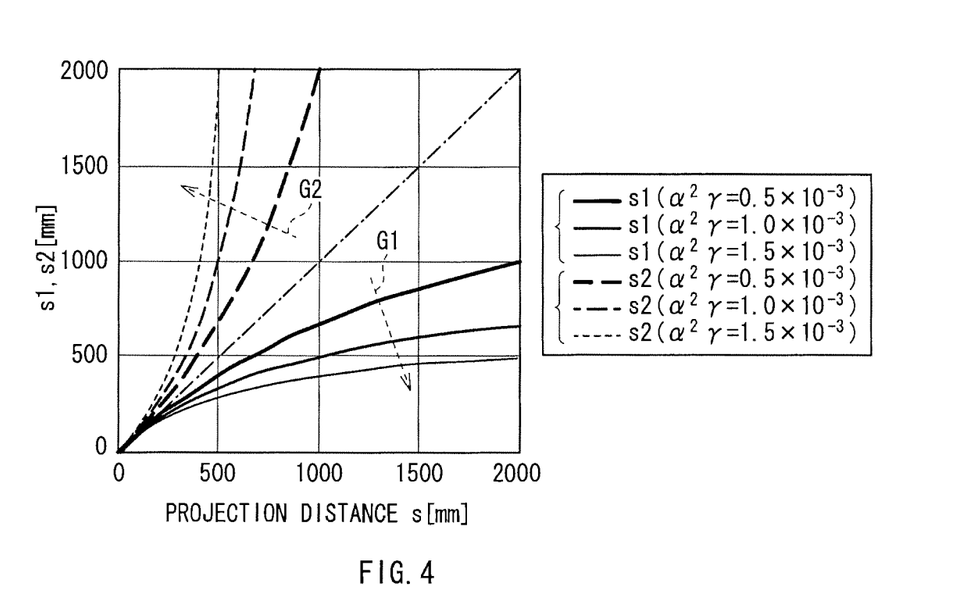
FIG. 4 is a characteristic diagram illustrating an example of a relationship between a projection distance "s" and a near-side projection distance s1 and between the projection distance "s" and a far-side projection distance s2.

Although the multiplication terms of $\alpha$ and $\gamma$ are equivalent between the formulas (18) and (19), the effect of $\alpha$ increases in a squared manner, while the effect of $\gamma$ linearly increases. FIG. 4 illustrates an example of the characteristics, which indicates variations of each of the near-side projection distance s1 and the far-side projection distance s2 depending on values of the projection distance s for various values of $\alpha^2\gamma$.

In FIG. 4, the depth of field increases (is widened) with an increase in a value of $\alpha^2\gamma$ (see arrows G1 and G2 in FIG. 4), which reveals expansion of a range in which focus adjustment is unnecessary, i.e., expansion of a range in which a substantial focus-free function is achieved. It is to be noted that although the projection distance s is considered as a distance from the principal point, the projection distance s may be considered as a distance from an end of a lens barrel, since a distance from the lens-barrel end to the principal point is substantially negligibly small compared with a distance from the lens-barrel end to a projected image.

Here, the near-side projection distance s1 and the far-side projection distance s2 in a projection field are expressed by the following formulas (20) and (21) with projection inch sizes Wmin [inch] and Wmax [inch], at each of which an image is in focus, respectively.

$$\begin{cases} s1 \leq T \cdot W_{min} \cdot k & (20) \\ s2 \geq T \cdot W_{max} \cdot k & (21) \end{cases}$$

The formulas (18) and (19) are solved for $\alpha^2\gamma$, thereby the following formula (22) is obtained. As a result, $\alpha^2\gamma$ in a certain range, which allows a boundary of each of the near-side projection distance s1 and the far-side projection distance s2, is expressed by the following formula (23). Consequently, if the following formula (24) is not established, the focus-free function is not achieved in a desired range.

$$\begin{cases} \alpha^2\gamma = \dfrac{s2-s1}{2s1\cdot s2} & (22) \\ \alpha^2\gamma \geq \dfrac{W_{max}-W_{min}}{2kT\cdot W_{max}W_{min}} & (23) \\ \dfrac{\varepsilon F}{TW'^2} \geq k\dfrac{W_{max}-W_{min}}{2W_{max}W_{min}} & (24) \end{cases}$$

If size of the pixel 210 (pixel size) d [mm] of the light modulation element 21 is foggily expanded two times, blur recognition is not performable. The permissible circle of confusion $\epsilon$ [mm] (in diameter) may be therefore limited to about 2.0×d or less. Here, the pixel size d is expressed by the following formula (25) with the horizontal pixel count ph of the light modulation element 21. As a result, the following conditional formula (26) is established.

$$\begin{cases} \varepsilon = 2d = \dfrac{2kW'}{Ph} & (25) \\ \dfrac{2F}{W'T_{P_h}} \geq \dfrac{W_{max}-W_{min}}{2W_{max}W_{min}} & (26) \end{cases}$$

(Range of Each Parameter in Conditional Formula)

In a practically available range of the projection display 3, for example, the focus-free function is advantageously achieved within a range of the diagonal size W of about 20 to 50 [inch] of the projected image 4. This is due to a fact that merits of projection itself are reduced in a diagonal size W smaller than the above range, and a fact that projection is barely performed from the viewpoint of the quantity of light in a diagonal size W larger than the above range.

Consequently, the right side of the formula (26) has a value of 0.015, and thus the following conditional formula (27) is established.

$$\{(2F)/(W'Tph)\}\geq 0.015 \qquad (27)$$

Although the geometrical F-number (here, the F-number F) described hereinbefore is basically used as the F-number of the projection lens 23, the F-number may be observed to substantially increase due to distribution of the quantity of light in a pupil (distribution of the quantity of light in an exit pupil) of the projection lens 23. Hereinafter, such substantial F-number is thus defined and used as pseudo-F-number F'.

Figure 5:
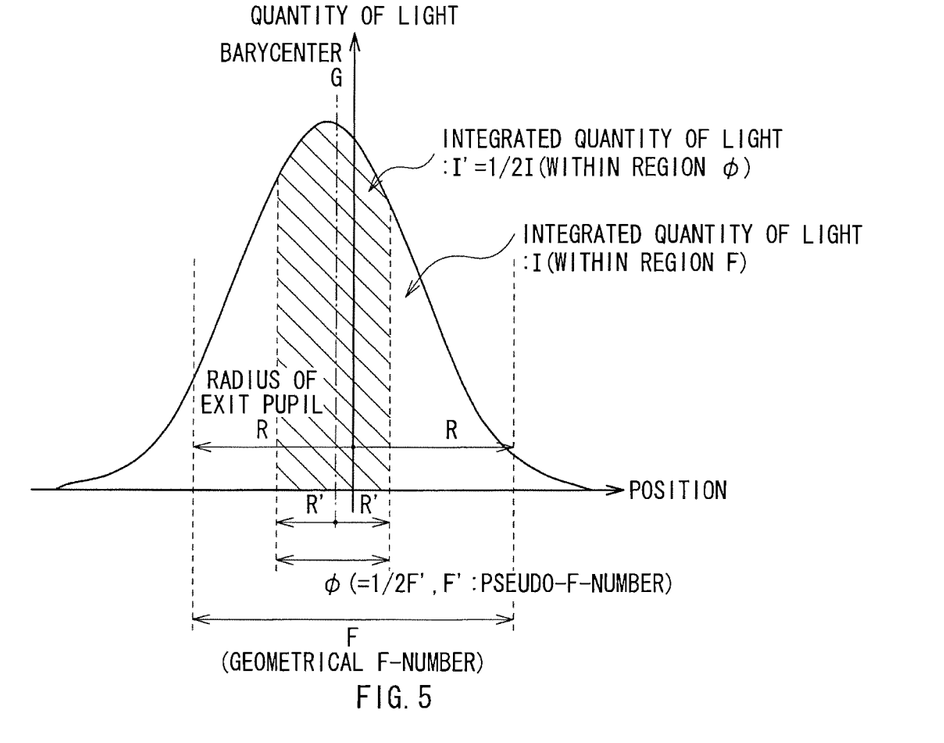
FIG. 5 is a schematic view for explaining a definition of pseudo-F-number F'.

FIG. 5 is a schematic view for explaining a definition of the pseudo-F-number F', which illustrates an example of distribution of the quantity of light in the exit pupil of the projection lens 23. Here, the radius of the exit pupil of the projection lens 23 is R; integrated quantity of light is I, which is obtained by radially integrating quantity of light up to the radius R of the exit pupil (the quantity of light in a region of $\phi$ illustrated in FIG. 5) in distribution of the quantity of light in the exit pupil of the projection lens 23; and integrated quantity of light, in distribution of the quantity of light in the exit pupil, is I'(=I/2), which is obtained by radially integrating quantity of light up to a predetermined radius R' about the barycenter G of the distribution of the quantity of light. The pseudo-F-number F' of the projection lens 23 is defined by the following formula (28) with the radius R of the exit pupil and the radius R' satisfying I'=I/2.

$$F'=\{(2FR')/R\} \qquad (28)$$

Figure 6A:
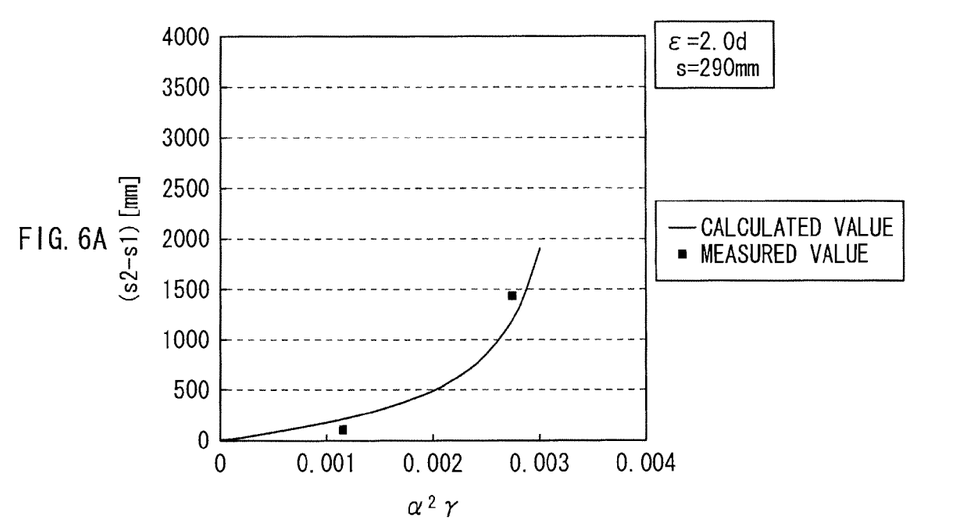
FIGS. 6A and 6B are characteristic diagrams illustrating an example of a substantial focus-free range determined using the pseudo-F-number F'.
Figure 6B:
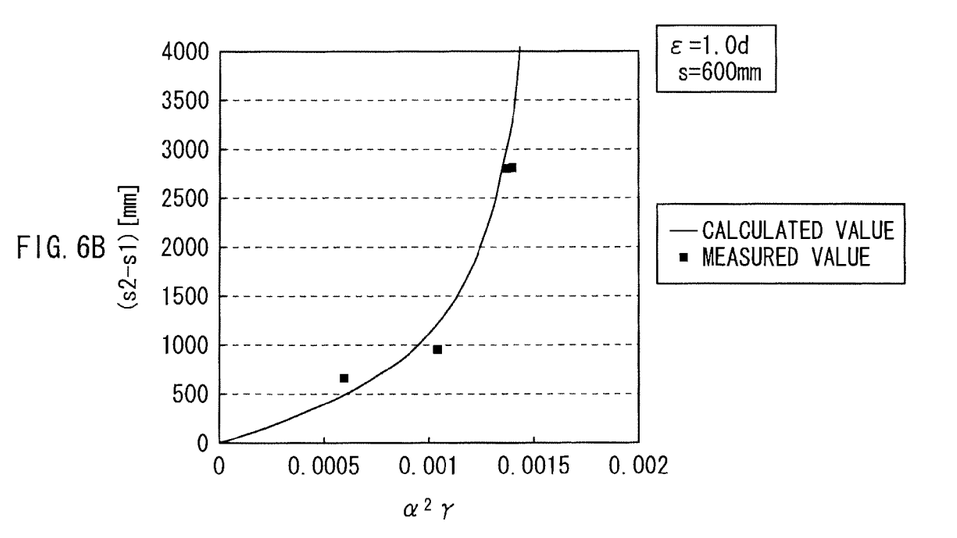
Figure 7A:
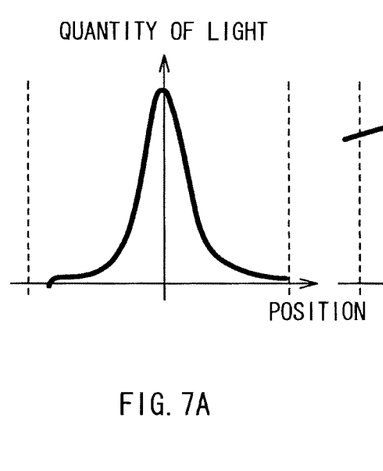
FIGS. 7A to 7C are schematic views each illustrating exemplary distribution of the quantity of light in an exit pupil of a projection lens.
Figure 7B:
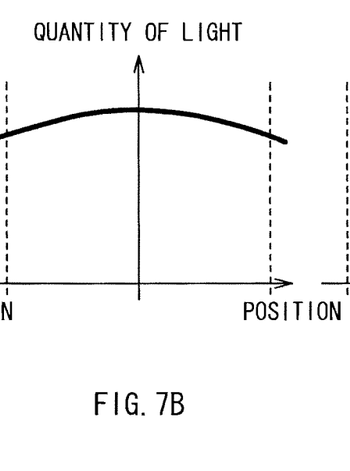
Figure 7C:
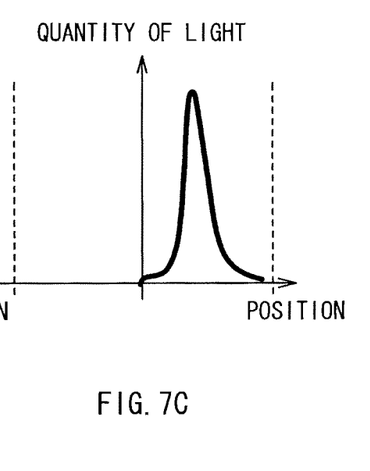

It is experimentally confirmed that the pseudo-F-number F' provides an effect equivalent to that of the regular F-number F in a simplified manner. FIGS. 6A and 6B illustrate an example of such effect. FIGS. 6A and 6B each illustrate the pseudo-F-number F' and a corresponding focal distance (s2-s1) for various types of distribution of the quantity of light (distribution of the quantity of light in an exit pupil) as illustrated in FIGS. 7A to 7C, for example. In FIGS. 6A and 6B, the horizontal axis indicates $\alpha^2\gamma$ described above, and the vertical axis indicates the focal distance (s2-s1). FIGS. 6A and 6B reveal that the focal range (the range in which the substantial focus-free function is achieved) is substantially identical with geometrical calculation results.

It is to be noted that FIG. 6A illustrates a result for $\epsilon$=2.0 d and s=290 mm, where calculated values are substantially identical with measured values. However, since the focal range is subjectively differently observed, the focal range may be more strictly observed. For example, if the focal range is strictly observed such that a value calculated with $\epsilon$ of about 1.0 d is identical with a measured value, sharpness increases in each focal range, and resolution feeling advantageously increases so that the projection display may be used for more applications such as a data projector. FIG. 6B corresponds to a result in such a case ($\epsilon$=1.0 d and s=600 mm), where calculated values are substantially identical with measured values. The focal range is therefore more preferably determined with $\epsilon$=1.0 d.

In this way, the F-number F described hereinbefore may be replaced by the pseudo-F-number F', which allows consideration of a case of illumination light being non-uniformly distributed. Specifically, the formula (27) may be re-defined with the pseudo-F-number F'. As a result, the following formula (29) is given. In other words, if the pseudo-F-number F' is used, a conditional formula defined by the formula (29) is preferably satisfied.

$$\{(4FR')/(W'TphR)\} \geq 0.015 \qquad (29)$$

For example, if the horizontal pixel count ph of the light modulation element 21 is 640, the pseudo-F-number F' is 2.0, the throw ratio T is 1.0, and the diagonal size W' of the light modulation element 21 is 0.2 [inch], the left side of the formula (29) has a value of 0.031. In other words, the condition defined by the formula (29) is satisfied, leading to achievement of the focus-free function within the range of the diagonal size W of about 20 to 50 [inch] as described above.

Parameters that have an influence on a focusing level include the throw ratio T, the diagonal size W' of the light modulation element 21, and the horizontal pixel count ph of the light modulation element 21. These parameters are included in the denominators of the formulas (27) and (29) and thus have a major impact on the focusing level.

In the case of the projection display 3 that is intended to be reduced in size, since the diagonal size W' [inch] of the light modulation element 21 is often at a degree at which the following formula (30) is established, the left side of each of the formulas (27) and (29) advantageously tends to increase. Accordingly, the projection display 3 according to the present embodiment is set to satisfy both the formulas (27) and (30) or satisfy both the formulas (29) and (30).

$$W' \leq 0.5 \qquad (30)$$

To satisfy the formula (27) or (29) (to achieve the substantial focus-free function), however, it is preferable to further reduce the diagonal size W' [inch], increase the F-number F (the pseudo-F-number F'), and reduce the throw ratio T.

Among these parameters, the throw ratio T depends on design of the projective lens 23, and is believed to be limited to about 0.8 or less ($0.8 \leq T$) in order to sufficiently reduce cost. In addition, the limit of the diagonal size W' [inch] of the light modulation element 21 greatly depends on light resistance and a manufacturing process of the light modulation element 21. In particular, if a liquid crystal device having an organic alignment film is used as the light modulation element 21, and if a liquid crystal surface is irradiated with blue laser light, W' is less likely to be reduced from the viewpoint of light resistance. Hence, a liquid crystal device having an inorganic alignment film or DMD is advantageously used as the light modulation element 21 to increase brightness of image light (brightness of the projected image 4) and to achieve the focus-free function. The liquid crystal device having an inorganic alignment film is relatively preferable particularly in a manufacturing process from the viewpoint of high image quality, between the liquid crystal device and the DMD.

To reduce the diagonal size W' [inch] of the light modulation element 21, highly directional light is preferably used to avoid degradation in light collection efficiency from the viewpoint of illumination efficiency. Hence, the light source section of the projection display 3 advantageously includes laser light sources (here, the red laser 11R, the green laser 11G, and the blue laser 11B) as in the present embodiment.

In this way, not only the elements and specification of the optical system in the projection display 3 but also a type of each device may be restricted in order to achieve the substantial focus-free function. For example, the projection display 3, in which a pencil of light (image light) projected from the projection lens 23 to the screen 30 is about 30 [lm] or more, preferably satisfies the following condition in order to satisfy the horizontal pixel count ph of the light modulation element 21 of 1000 or more for high image quality, and to achieve the substantial focus-free function. Specifically, it is preferable that the light modulation element 21 (the liquid crystal device having an inorganic alignment film) have a diagonal size W' of about 0.2 [inch], wide-angle design be made to provide a throw ratio T of about 1.0, and the optical system be adjusted to have an F-number F (pseudo-F-number F') of the projection lens 23 of about 2.0 or more.

Not only the size (inch number) of the projected image 4 but also the projection distance s are important to achieve the substantial focus-free function. Specifically, each of the near-side projection distance s1 and the far-side projection distance s2 is also preferably within a predetermined range from the viewpoint of brightness and/or a use of the projection display 3. In this sense, a smaller value of the throw ratio T facilitates achievement of the focus-free function. For example, if the projection distance s is 50 [inch], and the far-side projection distance s2 is about 1500 [mm], the projection display is readily used in various scenes, and an appropriate use range is provided for the projection display 3 that is intended to be reduced in size as described before. In this case, the range of the throw ratio T is about less than 1.36.

The depth of focus is widened with an increase in a value of the F-number F (the pseudo-F-number F') of the projection lens 23. However, if the value of the F-number F (the pseudo-F-number F') increases, a size of the projection display 3 may increase correspondingly, or a density of the integrator (here, the fly-eye lens 17) may increase, leading to an increase in processing loss. Hence, the F-number F is advantageously about 3.0 or less (the pseudo-F-number F' is about 10.0 or less).

In such a case, the F-number F (geometrical F-number) of the projection lens 23 is preferably as small as possible compared with the pseudo-F-number F', since such a small F-number may suppress loss of the quantity of light due to vignetting. On the other hand, if the value of the F-number F (geometrical F-number) is excessively small, size of the lens barrel of the projection lens 23 uselessly increases. Thus, the following formula (31) is advantageously satisfied as a rough guide, which is experimentally clarified.

$$0.4 \leq (F/F') \leq 0.8 \tag{31}$$

Although the diagonal size W of the projected image 4 has been described to be within a range of about 20 to 50 [inch], the diagonal size W may be set to fall within the following range to further improve user convenience (to be easier to use). Specifically, the diagonal size W may be set to fall within the range of about 20 to 70 [inch] or about 15 to 70 [inch]. The range of the projection distance s of the projection display 3, which is intended to be reduced in size, may have a lower limit of about 10 inches based on the degree of difficulty in design of the projection lens 23, and may have an upper limit of about 100 inches since an excessively-large projection size is not practical. In these cases, the right side of the formula (26) has the following values.

For W=20 to 70 [inch]: (the right side)=0.018
For W=15 to 70 [inch]: (the right side)=0.026
For W=10 to 100 [inch]: (the right side)=0.045

In other words, in these cases, conditions are preferably determined with the pseudo-F-number F' such that the following formulas (32), (33), or (34) is satisfied.

$$\{(4FR')/(W'TphR)\} \geq 0.018 \tag{32}$$

$$\{(4FR')/(W'TphR)\} \geq 0.026 \tag{33}$$

$$\{(4FR')/(W'TphR)\} \geq 0.045 \tag{34}$$

This shows that if the horizontal pixel count ph of the light modulation element 21 is 640, the pseudo-F-number F' is 2.0, the throw ratio T is 1.0, and the diagonal size W' of the light modulation element 21 is 0.2 [inch], as described before, the substantial focus-free function is achieved at W of 15 to 70 [inch]. In this case, however, a condition for high image quality may be severe. That is, if the horizontal pixel count ph of the light modulation element 21 is 1280, such a condition is eventually established at the pseudo-F-number F' of 3.3, the throw ratio T of 1.0, and the diagonal size W' of the light modulation element 21 of 0.2 [inch]. It may be easily expected that this may lead to a severe condition of the optical system, which may be disadvantageous for size reduction.

[Operation and Effects of Projection Display 3]

In the projection display 3, as illustrated in FIG. 1, first, the illuminating system 1 operates such that light emitted from each of the red laser 11R, the green laser 11G, and the blue laser 11B is collimated by each of the lenses 12R, 12G, and 12B, and parallel light is formed. Then, such types of laser light (red laser light, green laser light, and blue laser light) formed into parallel light in the above way are subjected to color composition (optical path composition) by the dichroic prisms 131 and 132. Each laser light subjected to optical path composition passes through the optical element 14, and then the laser light is collimated by the collimator lens 16 and formed into parallel light, and enters the fly-eye lens 17. The incident light is uniformed (uniformed in in-plane intensity distribution) by the fly-eye lens 17 and exits, and then the light is condensed by the condenser lens 18. In this way, the illuminating system 1 emits illumination light.

The illumination light is then selectively reflected by the polarization beam splitter 22, and the reflected light enters the light modulation element 21. The light modulation element 21 reflects the incident light while modulating the light based on an image signal, and thus emits the light in a form of image light. Since types of polarized light are different between incident light and outgoing light in the light modulation element 21, the image light exiting from the light modulation element 21 is selectively transmitted by the polarization beam splitter 22, and then enters the projection lens 23. The incident light (image light) is then (expansively) projected onto the screen 30 by the projection lens 23.

In this operation, for example, as illustrated in FIG. 2, the red laser 11R, the green laser 11G, and the blue laser 11B each intermittently emit light at a predetermined emission frequency fl (=flr, flg, and flb). As a result, the three types of laser light (red laser light, green laser light, and blue laser light) are time-divisionally and sequentially emitted. In addition, the light modulation element 21 time-divisionally and sequentially modulates laser light of a corresponding color based on an image signal of each color component (a red component, a green component, and a blue component). In this way, the projection display 3 performs color image display based on the image signals.

The projection display 3 of the present embodiment satisfies both the formulas (27) and (30) or satisfies both the formulas (29) and (30), thereby the projection display 3 has an increased depth of field, and achieves the substantial focus-free function without the AF mechanism incorporated therein.

As described before, in the present embodiment, both of the formulas (27) and (30) or both of the formulas (29) and (30) are satisfied, so that the substantial focus-free function is achieved without the AF mechanism (physical AF mechanism) incorporated in the projection display. The projection display therefore allows an improvement in user convenience while achieving reduction in size (reduction in weight and cost).

In addition, a deep three-dimensional object is easily projected, allowing an improvement in user interface.

It is to be noted that the pseudo-F-number F' described hereinbefore may have different values along the longitudinal, lateral, and oblique directions depending on a shape of distribution (profile) of the quantity of light in an exit pupil of the projection lens 23. In this case, variations of the value of the pseudo-F-number F' along each direction lead to variations of the depth of focus at a resolution corresponding to the direction. Since a projected image desirably has the same focal range between the longitudinal and lateral directions, the beam profile preferably has a circular shape. However, even if the values of the pseudo-F-number F' are different depending on the directions, satisfying the condition described in the present embodiment in one of the directions makes it possible to maintain the focal range in that direction.

The actual span of the depth of focus may be reduced from the value described hereinbefore at a screen portion having a high image height, such as a screen edge. One reason for this is that aberration is less likely to be reduced at a higher image height. In the present embodiment, however, the depth of focus may be roughly estimated by the range described in the present embodiment, and the estimated depth of focus may be maximized.

Modification

A modification of the above-described embodiment is now described. It is to be noted that the same components as those in the embodiment described above are designated by the same numerals, and description of them is appropriately omitted.

Figure 8:
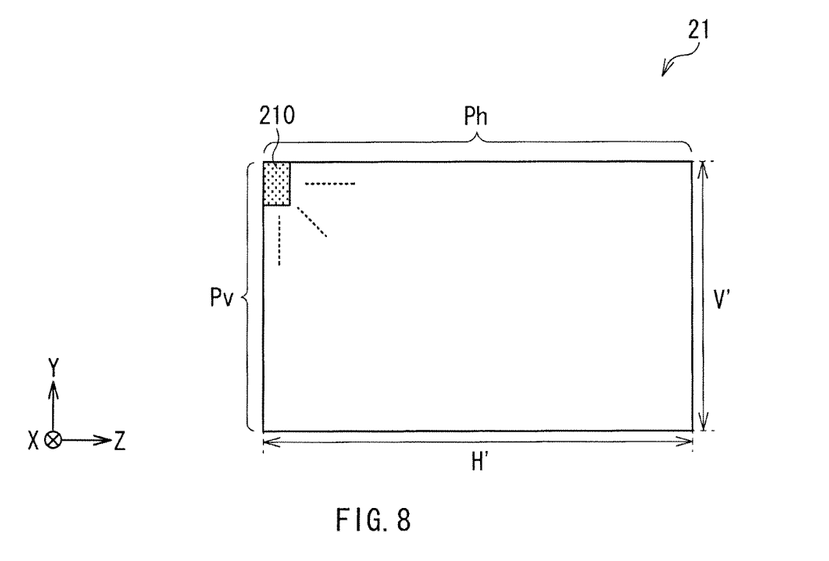
FIG. 8 is a schematic view illustrating an exemplary configuration of a light modulation element according to a modification.

FIG. 8 schematically illustrates an exemplary planar configuration of the light modulation element 21 according to the modification. For example, as illustrated in FIG. 2, the light modulation element 21 of the embodiment has the pixels 210 each having a square planar shape. In addition, the light modulation element 21 of the above-described embodiment is set to satisfy both the formulas (27) and (30) or satisfy both the formulas (29) and (30) in one or both of the horizontal (lateral) and vertical (longitudinal) directions.

In contrast, for example, as illustrated in FIG. 8, the light modulation element 21 of the modification has pixels 210 each having a rectangular planar shape (here, a vertical direction corresponds to a major axis direction, and a horizontal direction corresponds to a minor axis direction). In addition, the light modulation element 21 of the modification is set to satisfy both the formulas (27) and (30) or satisfy both the formulas (29) and (30) in the minor axis direction (here, the horizontal direction) of each pixel 210.

Such a configuration allows the modification to also provide the effects similar to those in the embodiment described above. In other words, the substantial focus-free function is achieved without the AF mechanism incorporated in the projection display, allowing an improvement in user convenience together with a reduction in size (reduction in weight and cost) of the projection display.

Other Modifications

Although the technology according to the present disclosure has been described with the embodiment and the modification hereinbefore, the technology is not limited thereto, and various modifications or alterations may be made.

For example, although the embodiment has been described with a prism array, a diffractive element, lenses, and a lens array as an example of the optical element 14, other optical elements may be used. Similarly, an optical element (for example, a rod integrator) other than the fly-eye lens 17 described in the embodiment may be used as the integrator.

In addition, although the embodiment and the modification have been described with a case where any of the plurality of types (red, green, and blue) of light sources is a laser light source, this is not limitative. Specifically, for example, one or more of the plurality of types of light sources may be a laser light source, i.e., a combination of a laser light source and another light source (for example, a light emitting diode (LED)) may be provided in a light source section. In addition, the light source section may include no laser light source, i.e., may include only another light source such as LED.

Furthermore, although the embodiment has been described with a case where three light sources, which emit three types of light having different wavelengths, are used, one, two, or four or more light sources may be used instead of the three light sources, for example.

In addition, although the embodiment has been described with specific components (optical system) of the illuminating system and the display, it is not necessary to provide all of the components. Also, other components may be further provided. In detail, for example, dichroic mirrors may be provided in place of the dichroic prisms 131 and 132.

Accordingly, it is possible to achieve at least the following configurations from the above-described example embodiments and the modifications of the disclosure.

<1> A projection display, including:
a light source section;
a light modulation element modulating, based on an image signal, light emitted from the light source section; and
a projection lens projecting the light modulated by the light modulation element onto a plane of projection,
wherein the following formulas (1) and (2) are satisfied:

$$\{(4FR')/(W'TphR)\} \geq 0.015 \quad (1)$$

$$W' \leq 0.5 \quad (2)$$

where: F is an F-number of the projection lens; W' is a diagonal size (inch number) of the light modulation element; ph is a pixel count in one side direction of the light modulation element; T is a throw ratio of the projection display itself (=a projection distance s/a distance L in the one side direction of a projected image on the plane of projection); R is a radius of an exit pupil of the projection lens; I is an integrated quantity of light obtained by, in a distribution of a quantity of light in the exit pupil of the projection lens, radially integrating the quantity of light up to the radius R of the exit pupil; and I' (=I/2) is an integrated quantity of light obtained by, in the distribution of the quantity of light in the exit pupil, radially integrating the quantity of light up to a predetermined radius R' about barycenter of the distribution of the quantity of light.

<2> The projection display according to <1>, wherein T<1.36 is satisfied.

<3> The projection display according to <1> or <2>, wherein $0.4 \leq (F/F') \leq 0.8$ is satisfied, where F' is a pseudo-F-number of the projection lens and is defined as $F'=\{(2FR')/R\}$.

<4> The projection display according to any one of <1> to <3>, wherein $\{(4FR')/(W'TphR)\} \geq 0.018$ is satisfied.

<5> The projection display according to <4>, wherein $\{(4FR')/(W'TphR)\} \geq 0.026$ is satisfied.

<6> The projection display according to any one of <1> to <5>, wherein $F' \leq 10.0$ is satisfied.

<7> The projection display according to any one of <1> to <6>, wherein a light flux of the light projected from the projection lens onto the plane of projection is about 30 [lm] or more.

<8> The projection display according to any one of <1> to <7>, wherein the formula (2) and the following formula (3) are satisfied:

$$\{(2F)/(W'Tph)\} \geq 0.015 \quad (3).$$

<9> The projection display according to any one of <1> to <8>, wherein the light source section includes a laser light source.

<10> The projection display according to <9>, wherein the light modulation element is configured of one of a digital micromirror device and a liquid crystal element.

<11> The projection display according to <10>, wherein the light modulation element is configured of a liquid crystal element having one of an inorganic alignment film and an organic alignment film, and $ph \geq 1000$ is satisfied.

<12> The projection display according to any one of <9> to <11>, wherein the laser light source is a blue laser.

<13> The projection display according to any one of <1> to <12>, wherein
the light modulation element has pixels each having a square planar shape, and
the formulas (1) and (2) are satisfied for one or both of a horizontal direction and a vertical direction each corresponding to the one side direction.

<14> The projection display according to any one of <1> to <12>, wherein
the light modulation element has pixels each having a rectangular planar shape, and
the formulas (1) and (2) are satisfied for a minor axis direction, that corresponds to the one side direction, of each of the pixels.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A projection display, comprising:
   a light source section;
   a light modulation element modulating, based on an image signal, light emitted from the light source section; and
   a projection lens projecting the light modulated by the light modulation element onto a plane of projection,
   wherein the following formulas (1) and (2) are satisfied:

$$\{(4FR')/(W'TphR)\} \geq 0.015 \quad (1)$$

$$W' \leq 0.5 \quad (2)$$

where: F is an F-number of the projection lens; W' is a diagonal size (inch number) of the light modulation element; ph is a pixel count in one side direction of the light modulation element; T is a throw ratio of the projection display itself (=a projection distance s/a distance L in the one side direction of a projected image on the plane of projection); R is a radius of an exit pupil of the projection lens; I is an integrated quantity of light obtained by, in a distribution of a quantity of light in the exit pupil of the projection lens, radially integrating the quantity of light up to the radius R of the exit pupil; and I' (=I/2) is an integrated quantity of light obtained by, in the distribution of the quantity of light in the exit pupil, radially integrating the quantity of light up to a predetermined radius R' about barycenter of the distribution of the quantity of light.

2. The projection display according to claim 1, wherein T<1.36 is satisfied.

3. The projection display according to claim 1, wherein $0.4 \leq (F/F') \leq 0.8$ is satisfied, where F' is a pseudo-F-number of the projection lens and is defined as $F' = \{(2FR')/R\}$.

4. The projection display according to claim 3, wherein $\{(4FR')/(W'TphR)\} \geq 0.018$ is satisfied.

5. The projection display according to claim 4, wherein $\{(4FR')/(W'TphR)\} \geq 0.026$ is satisfied.

6. The projection display according to claim 3, wherein $F' \leq 10.0$ is satisfied.

7. The projection display according to claim 3, wherein a light flux of the light projected from the projection lens onto the plane of projection is about 30 [lm] or more.

8. The projection display according to claim 1, wherein the formula (2) and the following formula (3) are satisfied:

$$\{(2F)/(W'Tph)\} \geq 0.015 \quad (3)$$

9. The projection display according to claim 1, wherein the light source section includes a laser light source.

10. The projection display according to claim 9, wherein the light modulation element is configured of one of a digital micromirror device and a liquid crystal element.

11. The projection display according to claim 10, wherein the light modulation element is configured of a liquid crystal element having one of an inorganic alignment film and an organic alignment film, and $ph \geq 1000$ is satisfied.

12. The projection display according to claim 9, wherein the laser light source is a blue laser.

13. The projection display according to claim 1, wherein
    the light modulation element has pixels each having a square planar shape, and
    the formulas (1) and (2) are satisfied for one or both of a horizontal direction and a vertical direction each corresponding to the one side direction.

14. The projection display according to claim 1, wherein
    the light modulation element has pixels each having a rectangular planar shape, and
    the formulas (1) and (2) are satisfied for a minor axis direction, that corresponds to the one side direction, of each of the pixels.

* * * * *